US012586706B2

(12) United States Patent
Matsuura

(10) Patent No.: US 12,586,706 B2
(45) Date of Patent: Mar. 24, 2026

(54) COIL COMPONENT AND METHOD OF MANUFACTURING THE SAME

(71) Applicant: TAIYO YUDEN CO., LTD., Tokyo (JP)

(72) Inventor: Hitoshi Matsuura, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 746 days.

(21) Appl. No.: 17/963,507

(22) Filed: Oct. 11, 2022

(65) Prior Publication Data

US 2023/0207180 A1 Jun. 29, 2023

(30) Foreign Application Priority Data

Dec. 28, 2021 (JP) ................................. 2021-215278

(51) Int. Cl.
*H01F 27/255* (2006.01)
*H01F 27/28* (2006.01)
*H01F 41/02* (2006.01)

(52) U.S. Cl.
CPC ........... *H01F 27/255* (2013.01); *H01F 27/28* (2013.01); *H01F 41/0246* (2013.01)

(58) Field of Classification Search
CPC .... H01F 27/255; H01F 27/28; H01F 41/0246; H01F 2003/106; H01F 3/08; H01F 3/10; H01F 17/045; H01F 27/292
USPC ........................................ 336/221, 200, 232
See application file for complete search history.

(56) References Cited

U.S. PATENT DOCUMENTS

2019/0096566 A1* 3/2019 Odahara ............... H01F 27/292
2021/0098165 A1* 4/2021 Mimura .............. H01F 17/0013
2021/0193362 A1* 6/2021 Tsuchiya ................... H01F 1/26
2021/0272740 A1* 9/2021 Wakabayashi .......... H01F 27/29

FOREIGN PATENT DOCUMENTS

JP 2008-013827 A 1/2008

* cited by examiner

*Primary Examiner* — Shawki S Ismail
*Assistant Examiner* — Kazi S Hossain
(74) *Attorney, Agent, or Firm* — CUSHMAN PARTNERS, LLC

(57) ABSTRACT

An embodiment provides a coil component including a base body, and a coil conductor provided in the base body. At least partial region of the base body contains (i) a plurality of first metal magnetic particles having a first aspect ratio greater than one and having a first average particle size and (ii) a plurality of second metal magnetic particles having a second aspect ratio greater than the first aspect ratio, having a second average particle size less than the first average particle size. The first and second metal magnetic particles are oriented in a reference direction in the base body.

14 Claims, 10 Drawing Sheets

COIL COMPONENT AND METHOD OF MANUFACTURING THE SAME

CROSS-REFERENCE TO RELATED APPLICATIONS

This application is based on and claims the benefit of priority from Japanese Patent Application Serial No. 2021-215278 (filed on Dec. 28, 2021), the contents of which are hereby incorporated by reference in their entirety.

TECHNICAL FIELD

The present disclosure relates to a coil component and a method of manufacturing the same.

BACKGROUND

Coil components are passive elements used in electronic devices. For example, coil components are used to eliminate noise in power source lines or signal lines. Coil components are constituted by a base body made of a magnetic material, a coil conductor provided in the base body, and an external electrode connected to the coil conductor.

Japanese Patent Application Publication No. 2008-013827 ("the '827 Publication") discloses a coil component having a base body containing metal magnetic particles. According to the technique disclosed in the '827 Publication, the metal magnetic particles are flattened to have an aspect ratio of 2 or more and oriented in a direction parallel to the magnetic path, so that the flattened metal magnetic particles can contribute to improve the effective magnetic permeability of the coil component.

While a high aspect ratio of the metal magnetic particles contained in the base body can contribute to improve the effective magnetic permeability of the coil component, it may result in a low filling factor of the metal magnetic particles in the base body. As the filling factor of the metal magnetic particles in the base body drops, the saturation magnetic flux density of the base body also drops. Coil components including base bodies with low saturation magnetic flux density are not favorably mounted on large-current circuits.

The '827 Publication discloses that the filling factor of the metal magnetic particles in the base body can be raised by mixing together metal magnetic particles having a relatively large diameter and metal magnetic particles having a relatively small diameter.

In the field of coil components, there is a demand for further improvement in effective magnetic permeability and saturation magnetic flux density.

SUMMARY

One of the objects of the present invention is to provide a coil component and a method of manufacturing the same that are capable of realizing high effective magnetic permeability and high saturation magnetic flux density. Other objects of the present invention will be made apparent through the entire description in the specification. The invention disclosed herein may also address drawbacks other than that grasped from the above description.

In base bodies containing particle mixture obtained by mixing together metal magnetic particles having a relatively large diameter (hereinafter, referred to as "the large particles") and metal magnetic particles having a smaller diameter than the large particles (hereinafter, referred to as "the small particles"), the filling factor of the metal magnetic particles in the base bodies drops more significantly when the aspect ratio of the large particles increases by a predetermined amount than when the aspect ratio of the small particles increases by the same amount. This means that the filling factor of the base bodies containing the particle mixture depends more on a change in aspect ratio of the large particles than on a change in aspect ratio of the small particles. The effective magnetic permeability of the base bodies containing the particle mixture, on the other hand, improves substantially equally between when the aspect ratio of the large particles increases by a predetermined amount and when the aspect ratio of the small particles increases by the same amount. In other words, the effective magnetic permeability of the base bodies containing the particle mixture is affected substantially equally by a change in aspect ratio of the small particles and by a change in aspect ratio of the large particles. Here, the aspect ratio of the metal magnetic particles may be represented as a ratio of the length of the longest axis of each particle to the length of the shortest axis.

The particles constituting the particle mixture have a spherical shape as their reference shape, which exhibits an aspect ratio of "1." The base bodies containing the particle mixture can achieve improved effective magnetic permeability while preventing a drop in filling factor of the metal magnetic particles in the base bodies if an increase in aspect ratio of the small particles from the aspect ratio of the reference shape is greater than an increase in aspect ratio of the large particles from the aspect ratio of the reference shape. Stated differently, the aspect ratios of the large and small particles are both set greater than one, the large and small particles are oriented in a reference direction, and the small particles are shaped to have a higher aspect ratio than the large particles. In this manner, the base bodies containing the particle mixture can achieve improved effective magnetic permeability, which is attributable to the increase in aspect ratio of the small particles, while preventing the increase in aspect ratio of the large particles from lowering the filling factor of the metal magnetic particles.

An embodiment provides a coil component including a base body, and a coil conductor provided in the base body. At least partial region of the base body contains (i) a plurality of first metal magnetic particles having a first aspect ratio greater than one and having a first average particle size and (ii) a plurality of second metal magnetic particles having a second aspect ratio greater than the first aspect ratio and having a second average particle size less than the first average particle size. The first and second metal magnetic particles are oriented in a reference direction in the base body.

In the embodiment, the second aspect ratio of the second metal magnetic particles having a relatively small diameter is higher than the first aspect ratio of the first metal magnetic particles having a relatively large diameter. Accordingly, the coil component can achieve improved effective magnetic permeability by increasing the second aspect ratio of the second metal magnetic particles and reduce a drop in saturation magnetic flux density by preventing a drop in filling factor of the metal magnetic particles in the base body that can be caused by an increase in the first aspect ratio of the first metal magnetic particles. Consequently, the coil component can achieve high effective magnetic permeability and high saturation magnetic flux density.

An embodiment provides a coil component including a base body and a coil conductor provided in the base body. In one embodiment, the base body includes an oriented region containing a plurality of first metal magnetic particles and a plurality of second metal magnetic particles. The oriented region accounts for at least part of the base body. The first metal magnetic particles may have a first average particle size. The first metal magnetic particles may have a first aspect ratio greater than one and may be oriented in a reference direction. The second metal magnetic particles may have a second average particle size smaller than the first average particle size. The second metal magnetic particles may have a second aspect ratio greater than the first aspect ratio and may be oriented in the reference direction.

In one embodiment, the coil conductor extends around a coil axis, and the reference direction extends perpendicularly to the coil axis. In one embodiment, the oriented region accounts for at least part of a first region covering one end surface of the coil conductor in an axial direction extending along the coil axis. In one embodiment, the one end surface of the coil conductor touches the first region.

In one embodiment, the reference direction extends parallel to the coil axis. In one embodiment, the oriented region occupies at least part of a core region that is inside a winding portion of the coil conductor in a radial direction centered on the coil axis. In one embodiment, the oriented region occupies at least part of a margin region that is outside a winding portion of the coil conductor in a radial direction centered on the coil axis.

In one embodiment, a ratio of the second aspect ratio to the first aspect ratio is 1.3 or more.

In one embodiment, the first aspect ratio is 1.2 or less.

In one embodiment, the second aspect ratio is 1.4 or more.

In one embodiment, the second aspect ratio is 5.0 or less.

In one embodiment, the first metal magnetic particles have first deformation strength, and the second metal magnetic particles have second deformation strength lower than the first deformation strengths.

In one embodiment, the base body further has a core region that is inside the coil conductor in a radial direction centered on the coil axis. The core region may contain a plurality of third metal magnetic particles. The third metal magnetic particles have a third average particle size. The third metal magnetic particles may have a third aspect ratio lower than the second aspect ratio.

In one embodiment, the core region touches the first region.

In one embodiment, the base body further has a second region covering the other end surface of the coil conductor in the axial direction. The second region may contain a plurality of fourth metal magnetic particles and a plurality of fifth metal magnetic particles. The fourth metal magnetic particles may have a fourth average particle size. The fourth metal magnetic particles may have a fourth aspect ratio greater than one and may be oriented in the reference direction perpendicular to the coil axis. The fifth metal magnetic particles may have a fifth average particle size less than the fourth average particle size. The fifth metal magnetic particles may have a fifth aspect ratio higher than the fourth aspect ratio and be oriented in the reference direction.

One embodiment relates to a circuit board including any one of the above coil components.

One embodiment relates to an electronic device including the circuit board.

An embodiment provides a method of manufacturing a coil component. The method includes steps of making a base body having a coil conductor provided therein, where the coil conductor extends around a coil axis, and providing an external electrode on the base body. The base body includes an oriented region containing the above-described first metal magnetic particles and the above-described second metal magnetic particles. The base body is made such that the first and second metal magnetic particles are oriented in a reference direction.

In one embodiment, the making of the base body includes applying a first molding pressure to a first magnetic material containing first magnetic powders and second magnetic powders to form a precursor of a plate-like core containing flattened first magnetic powders formed by flattening the first magnetic powders and flattened second magnetic powders formed by flattening the second magnetic powders; and applying a second molding pressure to the precursor formed by the applying of the first molding pressure, the coil conductor, and a second magnetic material to form the base body having the oriented region containing the first metal magnetic particles formed from the flattened first magnetic powders and the second metal magnetic particles formed from the flattened second magnetic powders.

In one embodiment, the second molding pressure is greater than the first molding pressure.

In one embodiment, the making of the base body includes mixing and kneading the first and second metal magnetic particles and a resin to produce a resin composition and applying the resin composition to a base film to make a magnetic sheet, and curing the resin contained in the magnetic sheet to form the magnetic sheet into the oriented region.

ADVANTAGEOUS EFFECTS

The present invention can provide a coil component and a method of manufacturing the same that is capable of realizing high magnetic permeability and high saturation magnetic flux density.

DESCRIPTION OF THE PREFERRED EMBODIMENTS

Various embodiments of the present invention will be described hereinafter with reference to the appended drawings. Elements common to a plurality of drawings are denoted by the same reference signs throughout the plurality of drawings. It should be noted that the drawings do not necessarily appear in accurate scales for convenience of description. The following embodiments of the present invention do not limit the scope of the claims. The elements described in the following embodiments are not necessarily essential to solve the problem addressed by the invention.

Figure 1:
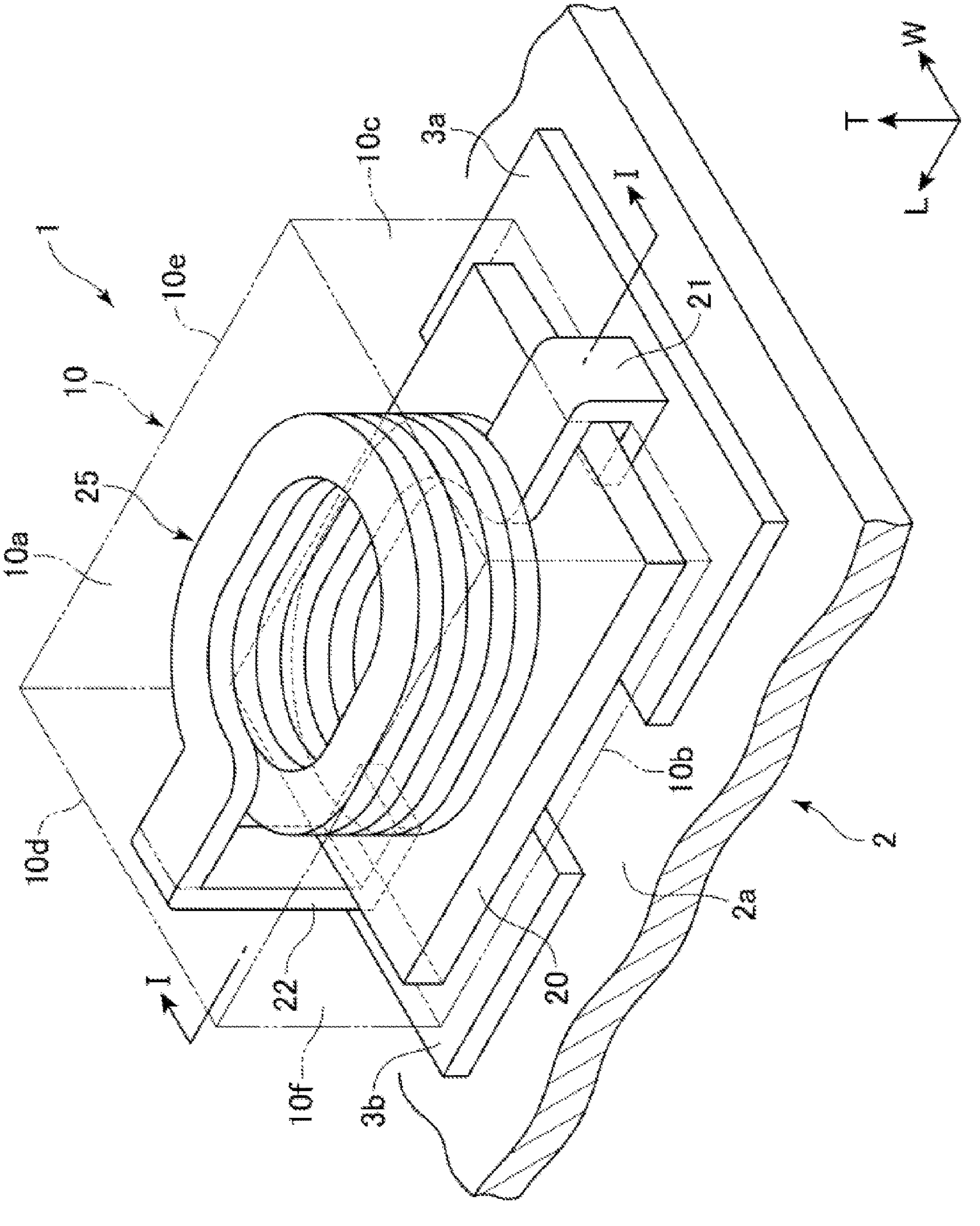
FIG. 1 is a perspective view schematically showing a coil component according to one embodiment of the present invention.
Figure 2:
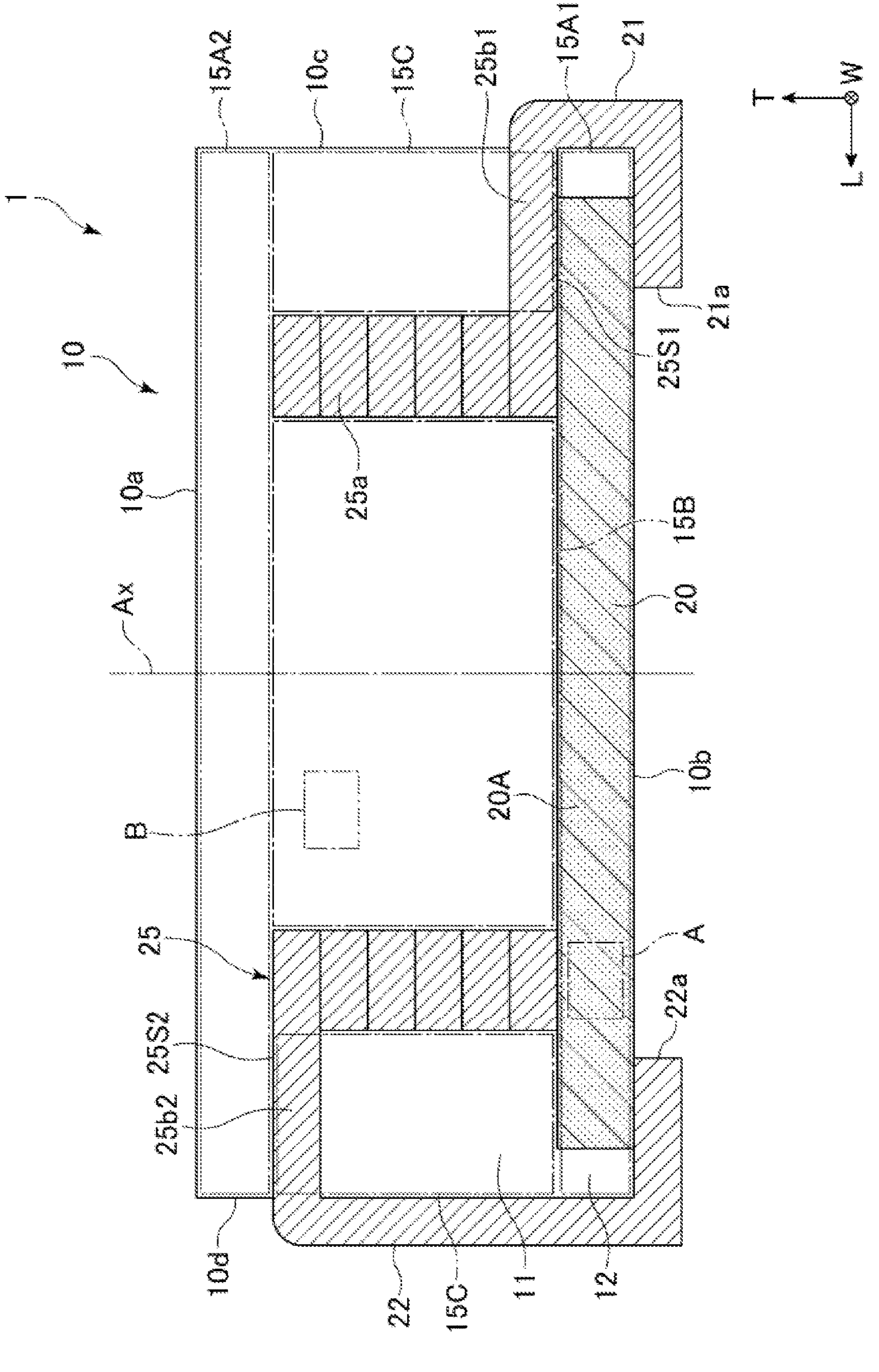
FIG. 2 is a sectional view of the coil component of FIG. 1 schematically showing a section along the line I-I.

A coil component 1 according to one embodiment of the invention will be hereinafter described with reference to FIGS. 1 and 2. FIG. 1 is a schematic perspective view of the coil component 1, and FIG. 2 is a schematic sectional view of the coil component 1, showing a section of the coil component 1 along the line I-I of FIG. 1. As shown in FIG. 1, the coil component 1 includes a base body 10, a coil conductor 25 provided in the base body 10, an external electrode 21 disposed on a surface of the base body 10, and an external electrode 22 disposed on the surface of the base body 10 at a position spaced apart from the external electrode 21. The external electrode 21 is electrically connected to one end of the coil conductor 25, and the external electrode 22 is electrically connected to the other end of the coil conductor 25.

The coil component 1 may be mounted on a mounting substrate 2*a*. The mounting substrate 2*a* has lands 3*a* and 3*b* provided thereon. The coil component 1 is mounted on the mounting substrate 2*a* by bonding the external electrode 21 to the land 3*a* and bonding the external electrode 22 to the land 3*b*. A circuit board 2 according to one embodiment of the present invention includes the coil component 1 and the mounting substrate 2*a* having the coil component 1 mounted thereon. The circuit board 2 can be mounted in various electronic devices. The electronic devices in which the circuit board 2 can be installed include smartphones, tablets, game consoles, electrical components of automobiles, servers, and various other electronic devices. For clarity, the mounting substrate 2*a* and the land 3*a*, 3*b* are not shown in the drawings other than FIG. 1.

The coil component 1 may be an inductor, a transformer, a filter, a reactor, an inductor array and any one of various other coil components. The coil component 1 may alternatively be a coupled inductor, a choke coil, and any one of various other magnetically coupled coil components. The coil component 1 may be, for example, an inductor used in a DC/DC converter. Applications of the coil component 1 are not limited to those explicitly described herein.

The base body 10 is made of a magnetic material. The base body 10 may have a rectangular parallelepiped shape. In one embodiment of the present invention, the base body 10 is configured such that the dimension in the L-axis direction (length dimension) is greater than the dimension in the W-axis direction (width dimension) and the dimension in the T-axis direction (height dimension). For example, the length dimension is from 1.0 mm and 6.0 mm, the width dimension is from 0.5 mm to 4.5 mm, and the height dimension is from 0.5 mm to 4.5 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense. The dimensions and shape of the base body 10 are not limited to those specified herein.

The base body 10 has a first principal surface 10*a*, a second principal surface 10*b*, a first end surface 10*c*, a second end surface 10*d*, a first side surface 10*e*, and a second side surface 10*f*. The outer surface of the base body 10 is defined by these six surfaces. The first principal surface 10*a* and the second principal surface 10*b* are at the opposite ends in the height direction of the base body 10, the first end surface 10*c* and the second end surface 10*d* are at the opposite ends in the length direction of the base body 10, and the first side surface 10*e* and the second side surface 10*f* are at the opposite ends in the width direction of the base body 10. As shown in FIG. 1, the first principal surface 10*a* is at a top of the base body 10, and therefore, the first principal surface 10*a* may be referred to as a "top surface". Likewise, the second principal surface 10*b* may be referred to as a "lower surface" or "bottom surface." Since the coil component 1 is disposed such that the second principal surface 10*b* faces the mounting substrate 2*a*, the second principal surface 10*b* may be herein referred to as "the mounting surface." The top surface 10*a* and the bottom surface 10*b* are separated from each other by a distance equal to the height of the base body 10, the first end surface 10*c* and the second end surface 10*d* are separated from each other by a distance equal to the length of the base body 10, and the first side surface 10*e* and the second side surface 10*f* are separated from each other by a distance equal to the width of the base body 10.

As shown in FIG. 2, the base body 10 relating to one embodiment includes a main body portion 11, a protruding portion 12 protruding downward (toward the negative side along the T-axis) from the main body portion 11 and a plate-like core 20 provided below the main body portion 11 and inside the protruding portion 12. The main body portion 11 and protruding portion 12 may form part of a single piece made of a magnetic material and shaped by compression molding. The main body portion 11 has a rectangular parallelepiped shape. The protruding portion 12 extends along at least one of the first end surface 10*c*, the second end surface 10*d*, the first side surface 10*e*, or the second side surface 10*f* of the base body 10. The protruding portion 12 defines part of at least one of the first end surface 10*c*, the second end surface 10*d*, the first side surface 10*e*, the second side surface 10*f* or the bottom surface 10*b*. In the embodiment shown, the plate-like core 20 has a rectangular parallelepiped shape and is thinner than the main body portion 11. The plate-like core 20 may have a rectangular parallelepiped shape and be thicker than the main body portion 11. The plate-like core 20 may be configured and arranged such that the first end surface 10*c*, the second end surface 10*d*, the first side surface 10*e* and the second side surface 10*f* of the base body 10 are at a constant distance from the external surface of the plate-like core 20. In this way, the protruding portion 12 can have a unique width in the circumferential direction around a coil axis Ax. When the base body 10 has a rectangular parallelepiped shape, the plate-like core 20 preferably also has a rectangular parallelepiped shape. The present embodiment, however, is not limited to such, and the plate-like core 20 can be shaped like a circular cylinder, an oval cylinder or any other shapes. The protruding portion 12 is positioned outside the plate-like core 20 in the radial direction centered on the coil axis Ax. The protruding portion 12 is arranged such that its internal surface may touch the external surface of the plate-like core 20. The plate-like core 20 may be arranged such that it may touch the lower surface of the main body portion 11.

The coil conductor 25 includes a winding portion 25*a* spirally extending around the coil axis Ax extending along the T axis, a lead-out portion 25*b*1 that is connected to one of the ends of the winding portion 25*a*, and a lead-out portion 25*b*2 that is connected to the other end of the winding portion 25*a*. In the embodiment shown, the winding portion 25*a* is wound around the coil axis Ax approximately 6.5 turns. In the illustrated embodiment, the winding portion 25*a* is shaped like any one of a circle, an ellipse, an oval, a square or any other shapes when seen in the T-axis direction.

The coil conductor 25 is electrically connected to the external electrode 21 via the lead-out conductor 25*b*1 and is electrically connected to the external electrode 22 via the lead-out conductor 25*b*2. The coil conductor 25 is made of a highly conductive material. The conductive material of the coil conductor 25 can be Ag, Pd, Cu, Al, or an alloy of these elements. The conductive material of the coil conductor 25 can preferably include at least one of Cu or Ag. The coil conductor 25 may be formed by folding a ribbon-like member. The surface of the coil conductor 25 may be covered by an insulating film. The insulating film is, for example, made of a highly insulating thermosetting resin. More specifically, the insulating film may be composed of a highly insulating resin such as polyurethane, polyamide-imide, polyimide, polyester, polyester-imide and the like.

The coil conductor 25 is provided on the plate-like core 20. The coil conductor 25 has a first coil surface 25S1 and a second coil surface 25S2. The first coil surface 25S1 is one of the end surfaces of the coil conductor 25 in an axial direction extending along the T-axis, and the second coil surface 25S2 is the other end surface of the coil conductor 25 in the axial direction. The first and second coil surfaces 25S1 and 25S2 face each other. The coil conductor 25 is provided such that the first coil surface 25S1 touches the plate-like core 20.

The base body 10 may be partitioned into a plurality of regions. For example, the base body 10 is divided into a first region 15A1, a second region 15A2, a core region 15B and a margin region 15C. The core and margin regions 15B and 15C are located between the first region 15A1 and the second region 15A2 in the T-axis direction. In the example shown in FIG. 2, the second region 15A2, core region 15B, and margin region 15C are included in the main body portion 11. As will be described below, a plate-like core similar to the plate-like core 20 may be also provided in the second region 15A2. When the second region 15A2 includes a plate-like core, the main body portion 11 may include the core and margin regions 15B and 15C, but not the second region 15A2.

The core region 15B indicates a partial region of the base body 10 that is inside the winding portion 25*a* of the coil conductor 25 in the radial direction centered on the coil axis Ax. When seen in the T-axis direction, the external surface of the core region 15B that defines its outer periphery in the radial direction has a shape corresponding to the shape presented by the internal surface of the winding portion 25*a*. The core region 15B is defined such that its external surface touches the internal surface of the winding portion 25*a*.

The margin region 15C indicates a partial region of the base body 10 that is outside the winding portion 25*a* of the coil conductor 25 in the radial direction centered on the coil axis Ax. When seen in the T-axis direction, the internal surface of the margin region 15C has a shape corresponding to the shape presented by the external surface of the winding portion 25*a*. The margin region 15C is defined such that its internal surface touches the external surface of the winding portion 25*a*.

The first region 15A1 indicates a partial region of the base body 10 that is positioned below the core and margin regions 15B and 15C. The first region 15A1 may also occupy a partial region of the base body 10 that is positioned below the coil conductor 25. The first region 15A1 may touch the core and margin regions 15B and 15C.

In the embodiment shown, the first region 15A1 includes the protruding portion 12 and plate-like core 20. The plate-like core 20 extends in the radial direction from the coil axis Ax beyond the external surface of the winding portion 25*a*. This means that the first coil surface 25S1 of the coil conductor 25 is covered with the plate-like core 20. In addition, the plate-like core 20 extends in the L-axis direction toward the negative side from the coil axis Ax beyond a radially inner end surface 21*a* of the external electrode 21 and also extends in the L-axis direction toward the positive side beyond a radially inner end surface 22*a* of the external electrode 22. Stated differently, the coil conductor 25 is disposed in a radially inner region defined within the outer periphery of the plate-like core 20 in the radial direction when seen in the T-axis direction.

In one embodiment, the plate-like core 20 may extend from one of the ends of the base body 10 to the other in the L-axis direction, or in the W-axis direction. In this case, the base body 10 does not have the protruding portion 12, and the first region 15A1 is solely occupied by the plate-like core 20.

The second region 15A2 indicates a partial region of the base body 10 that is positioned above the core and margin regions 15B and 15C. The second region 15A2 may also occupy a partial region of the base body 10 that is positioned above the coil conductor 25. The second region 15A2 may touch the core and margin regions 15B and 15C.

The external electrode 21 is connected to the lead-out portion 25*b*1 of the coil conductor 25. The external electrode 21 extends along the first end surface 10*c* and bottom surface 10*b*. The external electrode 22 is connected to the lead-out portion 25*b*2 of the coil conductor 25. The external electrode 22 extends along the second end surface 10*d* and bottom surface 10*b*. The lead-out portions 25*b*1 and 25*b*2 may extend outside the base body 10 through any one of the first end surface 10*c*, second end surface 10*d*, first side surface 10*e*, second side surface 10*f* and bottom surface 10*b*. In an embodiment where the external electrodes 21 and 22 extend outside the base body 10 through a surface other than the bottom surface 10*b*, the external electrodes 21 and 22 extend along the surface of the base body 10 to the bottom surface 10*b*.

The coil conductor 25 and external electrodes 21 and 22 may be formed as a single piece. In other words, the coil conductor 25 and external electrodes 21 and 22 may form a single (monolithic) component. For example, the coil conductor 25 and external electrodes 21 and 22 may be formed by folding a single ribbon-like conductive member. The shape and position of the external electrodes 21 and 22 shown are merely illustrative, and the external electrodes 21 and 22 can be variously shaped and positioned.

In one embodiment, the base body 10 contains a large number of metal magnetic particles made of a soft magnetic metal material. The metal magnetic particles are particles of a crystalline or amorphous alloy principally made of any one of Fe, Ni and Co. The metal magnetic particles may additionally contain B, C, O, Si, Al, Cr or other elements in order to have required magnetic, electric and/or mechanical characteristics. The metal magnetic particles may contain, in addition to the above-mentioned main element and additional element, unavoidable impurities. Specifically, the metal magnetic particles contained in the base body 10 may be particles of (1) a metal such as Fe, Ni or Co, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. In addition to these, the metal magnetic particles contained in the base body 10 may be particles of a Co—Nb—Zr alloy, an Fe—Zr—Cu—B alloy, an Fe—Si—B alloy, an Fe—Co—Zr—Cu—B alloy, an Ni—Si—B alloy, or an Fe—Al—Cr alloy.

In the base body 10, the metal magnetic particles may be bonded to each other with an oxide film formed by oxidation of an element included in the metal magnetic particles during a manufacturing process. The base body 10 may contain a binder in addition to the metal magnetic particles. When the base body 10 contains a binder, the metal magnetic particles are bonded to each other by the binder. The binder in the base body 10 may be formed, for example, by curing a thermosetting resin that has an excellent insulation property. Examples of a material for such a binder include an epoxy resin, a silicone resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin.

Figure 3A:
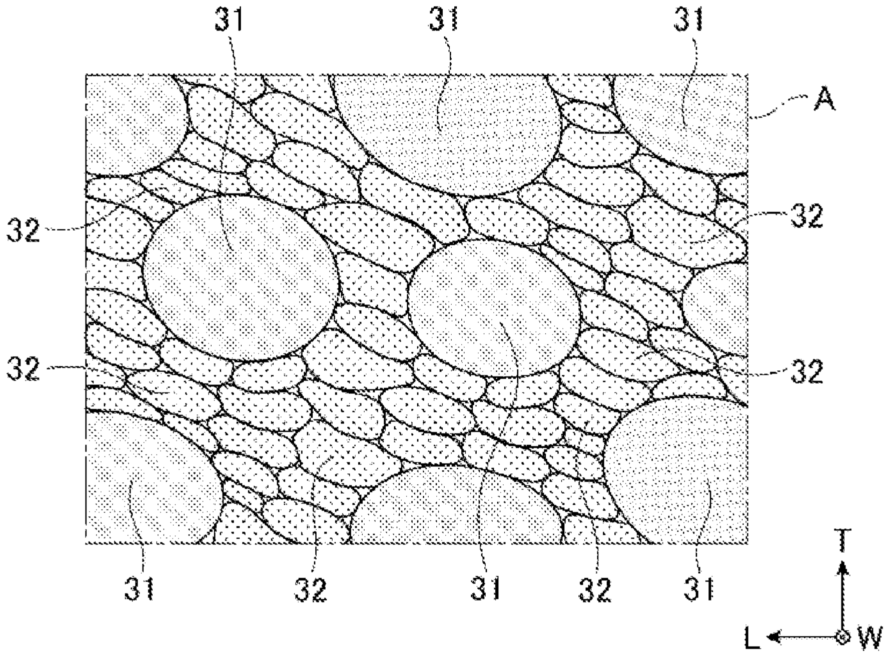
FIG. 3A is an enlarged sectional view of a region A indicated in FIG. 2.
Figure 3B:
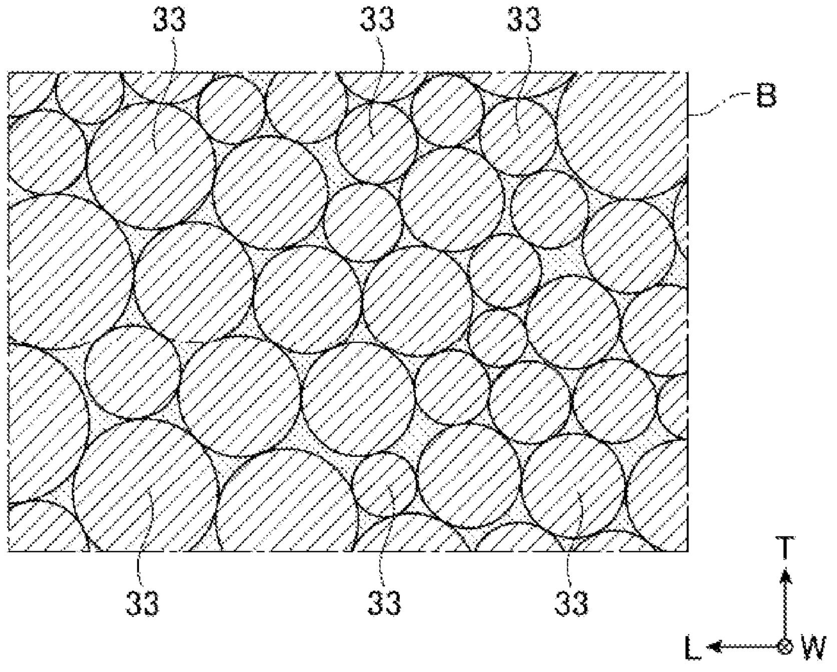
FIG. 3B is an enlarged sectional view of a region B indicated in FIG. 2.

The following now describes the microstructure of the base body 10 with reference to FIGS. 3A and 3B. FIGS. 3A and 3B are enlarged sectional views schematically showing a section of the base body 10. Specifically, FIG. 3A is an enlarged view of a region A shown in FIG. 2, and FIG. 3B is an enlarged view of a region B shown in FIG. 2. The region A is within the first region 15A1 of the base body 10. In the illustrated embodiment, the region A is within the plate-like core 20 in the first region 15A1. The region B is within the core region 15B of the base body 10.

As shown in FIG. 3A, the plate-like core 20 relating to one embodiment contains a plurality of first metal magnetic particles 31 and a plurality of second metal magnetic particles 32. As described above, adjacent ones of the first and second metal magnetic particles 31 and 32 may be bound to one another with an insulating film formed on the surface of the particles or via a binder such as an epoxy resin.

As shown in FIG. 3B, the base body 10 relating to one embodiment contains a plurality of third metal magnetic particles 33 in the core region 15B. The third metal magnetic particles 33 may be also bound to one another with an insulating film formed on the surface of the particles or via a binder such as an epoxy resin.

At least one of the protruding portion 12, the margin region 15C, or the second region 15A2 of the base body 10 may contain the same metal magnetic particles as the core region 15B, for example, the third metal magnetic particles 33.

The first, second and third metal magnetic particles 31, 32 and 33 are all described as examples of the metal magnetic particles contained in the base body 10. The first, second and third metal magnetic particles 31, 32 and 33 are thus particles of a crystalline or amorphous alloy principally made of any one of Fe, Ni and Co.

The first region 15A1 may contain metal magnetic particles other than the first and second metal magnetic particles 31 and 32. At least one of the protruding portion 12, the core region 15B, the margin region 15C, or the second region 15A2 may contain metal magnetic particles other than the third metal magnetic particles 33.

In one embodiment, the average particle size of the first metal magnetic particles 31 (hereinafter referred to as "the first average particle size") is greater than the average particle size of the second metal magnetic particles 12 (hereinafter referred to as "the second average particle size"). The average particle size of the third metal magnetic particles 33 (hereinafter referred to as "the third average particle size") may be equal to or greater than, or less than the first average particle size. The third average particle size may be equal to or greater than, or less than the second average particle size.

For example, the first average particle size is 25 μm, and the second average particle size is 4 μm. The first average particle size may be greater than 25 μm or less than 25 μm. The second average particle size may be greater than 4 μm or less than 4 μm. The average particle size of the first metal magnetic particles 31 is, for example, from 10 μm to 40 μm. The average particle size of the second metal magnetic particles 32 is, for example, from 0.2 μm to 8 μm. The first average particle size of the first metal magnetic particles is preferably equal to or less than one-fifth of the second average particle size of the second metal magnetic particles.

The "average particle size" of the metal magnetic particles contained in the base body 10 is determined based on a particle size distribution. To determine the particle size distribution, the base body 10 is cut along the thickness direction (T-axis direction) to expose a section, and the section is scanned by a scanning electron microscope (SEM) to take a photograph at a 1000 to 2000-fold magnification, and the particle size distribution is determined based on the photograph. For example, the value at 50 percent (D50) of the particle size distribution determined based on the SEM photograph can be set as the average particle size of the metal magnetic particles. Some of the metal magnetic particles contained in the base body 10 may have a flattened shape. The metal magnetic particles may not have a uniform shape but irregular shapes. The particle size of irregularly shaped metal magnetic particles may be expressed in a circular equivalent diameter (Haywood diameter), as is known among those skilled in the art.

The fact that the base body 10 contains particle mixture obtained by mixing together metal magnetic particles of two or more types having different average particle sizes can be confirmed by creating a particle size distribution based on a SEM photograph and identifying two or more peaks in the particle size distribution.

In one embodiment, the second metal magnetic particles 32 have lower deformation strength than the first metal magnetic particles 31. Deformation of metal magnetic particles (including the first and second metal magnetic particles 31 and 32) can be divided into plastic deformation and elastic deformation. As used herein, the term "deformation strength" may mean deformation strength that may be observed when plastic or elastic deformation occurs. In the specification, the deformation strength of the first metal magnetic particles 31 may be referred to as first deformation strength, and the deformation strength of the second metal magnetic particles 32 may be referred to as second deformation strength. Following these rules, the second deformation strength is lower than the first deformation strength in one embodiment. The deformation strength of the metal magnetic particles is an index representing how difficult it is to deform the metal magnetic particles and measured in accordance with JIS Z 8844:2019, for example. The deformation strength of the metal magnetic particles can be measured using, for example, a micro compression tester (MCT-211) available from SHIMADZU Corporation. In one embodiment of the present invention, the second deformation strength is lower than the first deformation strength, so that the second metal magnetic particles 32 are less difficult to deform during the compression molding than the first metal magnetic particles 31.

By tuning the composition of the first and/or second metal magnetic particles 31 and 32, the second deformation strength of the second metal magnetic particles 32 can be less than the first deformation strength of the first metal magnetic particles 31. For example, in a case where both the first metal magnetic particles 31 and the second metal magnetic particles 32 are of a Fe—Si—Cr crystalline alloy, the Si content ratio is controlled to be lower in the second metal magnetic particles 32 than in the first metal magnetic particles 31, so that the second deformation strength can be lower than the first deformation strength.

Figure 4A:
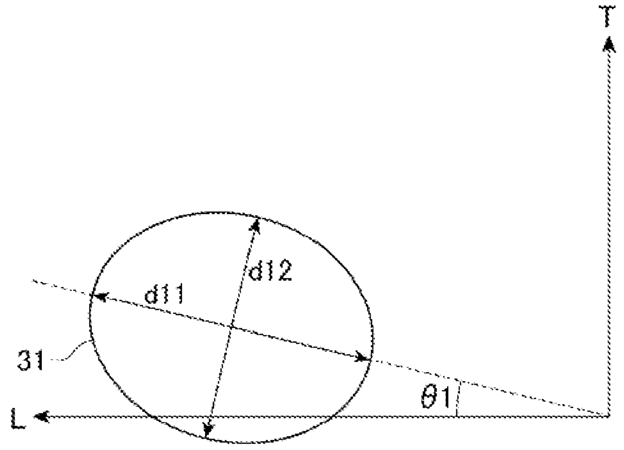
FIG. 4A is a schematic view illustrating first metal magnetic particles 31.
Figure 4B:
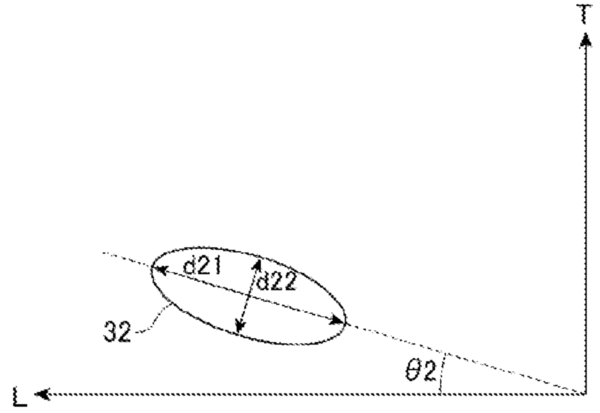
FIG. 4B is a schematic view illustrating second metal magnetic particles 32.
Figure 4C:
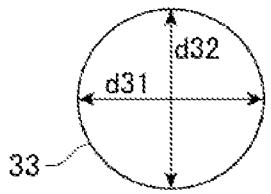
FIG. 4C is a schematic view illustrating third metal magnetic particles 33.

Referring now to FIGS. 4A to 4C, the following describes the shape, aspect ratio, and orientation in the base body 10 of the first, second and third metal magnetic particles 31, 32, and 33. FIGS. 4A to 4C are schematic views illustrating the first to third metal magnetic particles 31 to 33.

As shown in FIGS. 4A and 4B, the first and second metal magnetic particles 31 and 32 may have a flattened shape. The aspect ratio of each of the first metal magnetic particles 31 (hereinafter referred to as "the first aspect ratio R1") and the aspect ratio of each of the second metal magnetic particles 32 (hereinafter referred to as "the second aspect ratio R2") are both greater than 1.0. Since both the first aspect ratio R1 and the second aspect ratio R2 are greater than 1, the first and second metal magnetic particles 31 and 32 both have a flattened shape. The aspect ratio of each of the third metal magnetic particles 33 (hereinafter referred to as "the third aspect ratio R3") may be 1.0, or greater than 1.0. This means that the third metal magnetic particles 33 may have a spherical or flattened shape.

Here, the aspect ratio of the metal magnetic particles is represented as a ratio of the length of the longest axis of each particle to the length of the shortest axis. In the example shown in FIG. 4A, the longest axis of the first metal magnetic particles 31 has a length d11, and the shortest axis has a length d12. The first aspect ratio R1 of the first metal magnetic particles 31 is accordingly expressed as d11/d12. FIG. 4B shows a length d21 and a length d22 of the longest and shortest axes of the second metal magnetic particles 32. In the example shown in FIG. 4B, the second aspect ratio R2 of the second metal magnetic particles 32 is expressed as d21/d22. FIG. 4C shows a length d31 and a length d32 of the longest and shortest axes of the third metal magnetic particles 33. The third aspect ratio R3 of the third metal magnetic particles 33 is expressed as d31/d32 in the example shown in FIG. 4C.

In one embodiment, the first aspect ratio R1 of the first metal magnetic particles 31 is 1.2 or less. This means that the first aspect ratio R1 may be $1<R1\leq 1.2$. As the first aspect ratio R1 increases, the filling factor of the metal magnetic particles in the plate-like core 20 decreases and the saturation magnetic flux density decreases. Accordingly, the upper limit of the first aspect ratio R1 is set at 1.2 in one embodiment. When the first aspect ratio R1 of the first metal magnetic particles 31 is set to 1 (i.e., when the first metal magnetic particles 31 are spherically shaped, it is difficult to orient the second metal magnetic particles 32 in a given direction. In one embodiment, the first aspect ratio R1 of the first metal magnetic particles 31 is set greater than 1, so that the second metal magnetic particles 32 are more easily oriented in a predetermined direction.

In one embodiment, the second aspect ratio R2 is greater than the first aspect ratio R1. In one embodiment, the second aspect ratio R2 of the second metal magnetic particles 32 is 1.4 or more. In one embodiment, the second aspect ratio R2 of the second metal magnetic particles 32 is 5.0 or less. This means that the second aspect ratio R2 may be $1.4<R2\leq 5.0$. Since the second aspect ratio R2 takes a large value, the coil component 1 can achieve high effective magnetic permeability while reducing a drop in filling factor of the metal magnetic particles in the plate-like core 20. Note that, if the second aspect ratio R2 is excessively high, the drop in filling factor of the metal magnetic particles in the plate-like core 20 is no longer negligible. To address this issue, in one embodiment, the second aspect ratio R2 is set to satisfy $1.4<R2\leq 5.0$, so that the coil component 1 can achieve high effective magnetic permeability while preventing a reduction in filling factor of the metal magnetic particles in the plate-like core 20.

In one embodiment, the ratio of the second aspect ratio R2 to the first aspect ratio R1 (R2/R1) is 1.3 or more. In other words, in one embodiment, the second aspect ratio R2 is 1.3 times or more as large as the first aspect ratio R1. Note that a high second aspect ratio R2 does not prevent a significant drop in filling factor of the metal magnetic particles in the plate-like core 20 if the first aspect ratio R1 is high. To address this issue, in one embodiment, the second aspect ratio R2 is set 1.3 times or more as high as the first aspect ratio R1, so that the coil component 1 can achieve high effective magnetic permeability while preventing a drop in filling factor of the metal magnetic particles in the plate-like core 20. In this manner, the filling factor of the metal magnetic particles in the plate-like core 20 can be 75% or more.

In one embodiment, the third aspect ratio R3 is lower than the second aspect ratio R2 of the second metal magnetic particles 32.

In one embodiment, the first metal magnetic particles 31 are oriented perpendicularly to the coil axis Ax. In this specification, the first metal magnetic particles 31 are deemed to be oriented perpendicularly to the coil axis Ax extending along the T axis if the first metal magnetic particles 31 are oriented in the following manners. As shown in FIG. 4A, a first inclination angle θ1 denotes the angle formed between the L axis and the long axis of the first metal magnetic particles 31. The base body 10 is cut along the T-axis direction to expose a section. A partial region of the section that is within the plate-like core 20 is photographed using a scanning electron microscope (SEM) at a magnification of 1000× to 2000×, and the first inclination angle θ1 is measured for each of the first metal magnetic particles 31 shown in the SEM photograph. If the first metal magnetic particles 31 having a first inclination angle θ1 within the range of $-45°<\theta 1<45°$ account for 50% or more, based on the number of particles, of the first metal magnetic particles 31 shown in the SEM photograph, the first metal magnetic particles 31 in the plate-like core 20 are determined to be oriented perpendicularly to the coil axis Ax (T axis). The first metal magnetic particles 31 having a first inclination angle θ1 within the range of $-45°<\theta 1<45°$ may be required to account for 60% or more, 70% or more, 80% or more, or 90% or more.

In one embodiment, like the first metal magnetic particles 31, the second metal magnetic particles 32 are oriented perpendicularly to the coil axis Ax. Whether the second metal magnetic particles 32 are oriented perpendicularly to the coil axis Ax can be determined in the same manner as in the case of the first metal magnetic particles 31. To be specific, as shown in FIG. 4B, a second inclination angle θ2 denotes the angle formed between the L axis and the long axis of the second metal magnetic particles 32. The base body 10 is cut along the T-axis direction to expose a section. A partial region of the section that is within the plate-like core 20 is photographed using a scanning electron microscope (SEM) at a magnification of 1000× to 2000×, and the second inclination angle θ2 is measured for each of the second metal magnetic particles 32 shown in the SEM photograph. If the second metal magnetic particles 32 having a second inclination angle θ2 within the range of −45°<θ2<45° account for 50% or more, based on the number of particles, of the second metal magnetic particles 32 shown in the SEM photograph, the second metal magnetic particles 32 in the plate-like core 20 are determined to be oriented perpendicularly to the coil axis Ax (T axis). The second metal magnetic particles 32 having a second inclination angle θ2 within the range of −45°<θ2<45° may be required to account for 60% or more, 70% or more, 80% or more, or 90% or more. Since the aspect ratio R2 of the second metal magnetic particles 32 is higher than the aspect ratio R1 of the first metal magnetic particles 31, the required ratio of the second metal magnetic particles 32 having a second inclination angle θ2 within the range of −45°<θ2<45° based on the number of particles may be higher than the required ratio of the first metal magnetic particles 31 having a first inclination angle θ1 within the range of −45°<θ1<45° based on the number of particles.

The magnetic flux is produced when the current flowing through the coil conductor 25 changes, and flows substantially perpendicularly to the T-axis in a large part of the first region 15A1. Considering this, the coil component 1 can achieve improved effective magnetic permeability if the first and second metal magnetic particles 31 and 32 are oriented perpendicularly to the coil axis Ax in the plate-like core 20 included in the first region 15A1.

The following now describes a modification example, where the first and second metal magnetic particles 31 and 32 are oriented in a different direction. In one embodiment, the core region 15B may contain the first and second metal magnetic particles 31 and 32. When the core region 15B contains the first and second metal magnetic particle 31 and 32, the first and second metal magnetic particles 31 and 32 can be both oriented in a direction extending along the coil axis Ax (perpendicularly to the LW plane). Whether the first and second metal magnetic particles 31 and 32 are oriented in the direction extending along the coil axis Ax can be confirmed in the same manner as whether the first and second metal magnetic particles 31 and 32 are oriented perpendicularly to the coil axis Ax.

The magnetic flux is produced when the current flowing through the coil conductor 25 changes, and flows substantially along the T-axis (parallel to the T axis) in a large part of the core region 15B. Considering this, the coil component 1 can achieve improved effective magnetic permeability if the first and second metal magnetic particles 31 and 32 contained in the core region 15B are oriented parallel to the coil axis Ax.

In one embodiment, the margin region 15C may contain the first and second metal magnetic particles 31 and 32. When the margin region 15C contains the first and second metal magnetic particle 31 and 32, the first and second metal magnetic particles 31 and 32 can be both oriented in a direction extending along the coil axis Ax. The magnetic flux is produced when the current flowing through the coil conductor 25 changes, and flows substantially along the T-axis (parallel to the T axis) in a large part of the margin region 15C. Considering this, the coil component 1 can achieve improved effective magnetic permeability if the first and second metal magnetic particles 31 and 32 contained in the margin region 15C are oriented parallel to the coil axis Ax.

When the core region 15B contains the first and second metal magnetic particle 31 and 32, and/or when the margin region 15C contains the first and second metal magnetic particles 31 and 32, the coil axis Ax may alternatively extend perpendicularly to the T axis and the first and second metal magnetic particles 31 and 32 can be oriented perpendicularly to the T axis. In this case, the winding portion 25*a* of the coil conductor 25 extends around the coil axis Ax extending perpendicularly to the T-axis direction.

As used herein, the term "oriented region" refers to a partial region of the base body 10 that contains the first and second metal magnetic particles 31 and 32 oriented in a predetermined direction. The oriented region accounts for the entire or part of the base body 10. In the embodiment shown in FIG. 2, the plate-like core 20 (i.e., part of the first region 15A1 of the base body 10) is identified as the oriented region of the base body 10 since the first and second metal magnetic particles 31 and 32 oriented perpendicularly to the coil axis Ax are contained in the plate-like core 20. Similarly, if the core region 15B of the base body 10 contains the first and second metal magnetic particles 31 and 32 in a partial region thereof, the partial region of the core region 15B containing the first and second metal magnetic particles 31 and 32 (a partial region of the core region 15B) is identified as the oriented region of the base body 10. If the entire region of the core region 15B contains the first and second metal magnetic particles 31 and 32, the entire core region 15B is identified as the oriented region. Similarly, the oriented region of the base body 10 can be the entire or part of the margin region 15C. When the oriented region is included in the core region 15B and/or margin region 15C, the first and second metal magnetic particles 31 and 32 may be both oriented in the direction extending along the coil axis Ax as described above. There may be more than one oriented region in the base body 10. For example, both the core region 15B and the margin region 15C may be identified as oriented regions.

In the plate-like core 20, the second aspect ratio R2 of the second metal magnetic particles 32 having a relatively small diameter is higher than the first aspect ratio R1 of the first metal magnetic particles 31 having a relatively large diameter. The coil component 1 can achieve improved effective magnetic permeability by setting the second aspect ratio R2 of the second metal magnetic particles 32 significantly higher than the aspect ratio of the reference shape (spherical shape) (i.e., "1") and reduce a drop in saturation magnetic flux density by preventing a drop in filling factor of the metal magnetic particles in the base body 10 that can be caused by an increase in the first aspect ratio R1 of the first metal magnetic particles 31 from the aspect ratio of the reference shape. Consequently, the coil component 1 can achieve high effective magnetic permeability and high saturation magnetic flux density.

Figure 5:
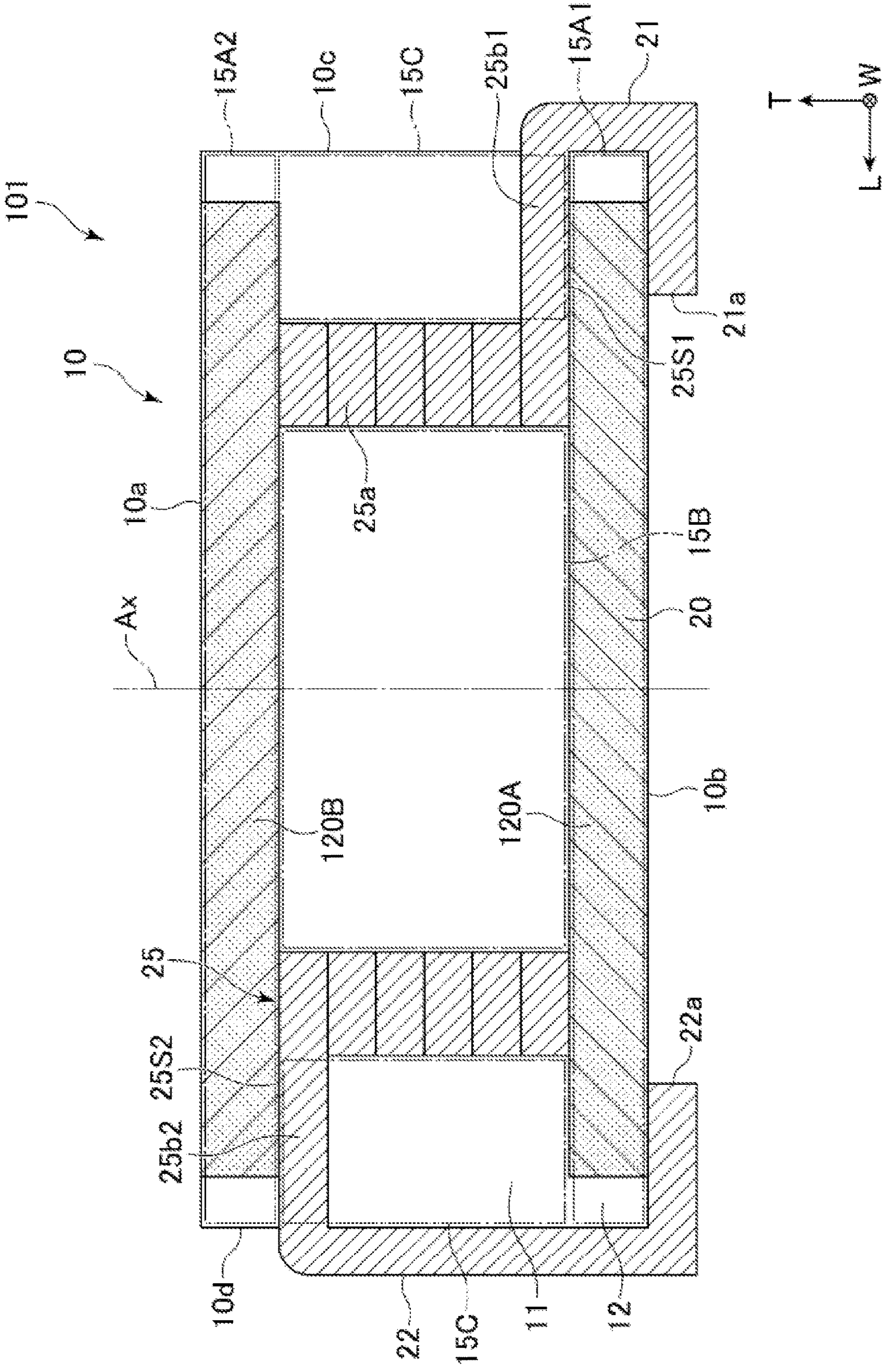
FIG. 5 is a sectional view showing a partial section of a coil component according to another embodiment of the present invention.

Another embodiment of the invention will be described with reference to FIG. 5. FIG. 5 is a sectional view showing a section of a coil component 101 according to another embodiment of the present invention. The coil component 101 is different from the coil component 1 in that the second region 15A2 additionally included a plate-like core. More specifically, the coil component 101 has a first plate-like core 120A and a second plate-like core 120B. The first plate-like core 120A is present in the first region 15A1, and the second plate-like core 120B is present in the second region 15A2.

The first plate-like core 120A may be configured and arranged in the same manner as the plate-like core 20 described above. The second plate-like core 120B is provided such that a second coil surface 25S2 touches the coil conductor 25. This means that the second coil surface 25S2 of the coil conductor 25 is covered with the second plate-like core 120B.

In one embodiment, the second plate-like core 120B can contain metal magnetic particles having two different particle sizes, like the plate-like core 20. For example, the second plate-like core 120B can contain fourth metal magnetic particles (not shown) having a relatively large diameter and fifth metal magnetic particles (not shown) having a relatively small diameter. The average particle size of the fourth metal magnetic particles, or a fourth average particle size is greater than the average particle size of the fifth metal magnetic particles, or a fifth average particle size. In one embodiment, the aspect ratio of each of the fourth metal magnetic particles (hereinafter, referred to as "the fourth aspect ratio R4") and the aspect ratio of each of the fifth metal magnetic particles (hereinafter, referred to as "the fifth aspect ratio R5") are both greater than 1.0, and the fifth aspect ratio R5 is greater than the fourth aspect ratio. The fourth aspect ratio R4 may change within the same range as the first aspect ratio R1. The fifth aspect ratio R5 may change within the same range as the second aspect ratio R2. The fourth and fifth metal magnetic particles are both oriented perpendicularly to the coil axis Ax. The description made for the first metal magnetic particles 31 also applies to the fourth metal magnetic particles to the maximum extent, and the description made for the second metal magnetic particles 32 also applies to the fourth metal magnetic particles to the maximum extent.

In the coil component 101, the plate-like cores 120A and 120B are identified as oriented regions of the base body 10.

In the coil component 101, the second aspect ratio R2 is higher than the first aspect ratio R1 in the first plate-like core 120A, and the fifth aspect ratio R5 is higher than the fourth aspect ratio R4 in the second plate-like core 120B. In this manner, the coil component 101 can achieve further improved effective magnetic permeability, when compared with the coil component 1, and can further prevent a drop in saturation magnetic flux density as a drop in filling factor of the metal magnetic particles in the base body 10 can be further reduced.

Figure 6A:
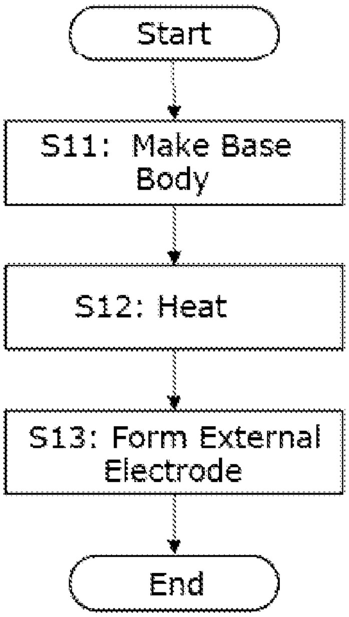
FIG. 6A is a flowchart showing a method of manufacturing a coil component according to one embodiment of the present invention.
Figure 6B:
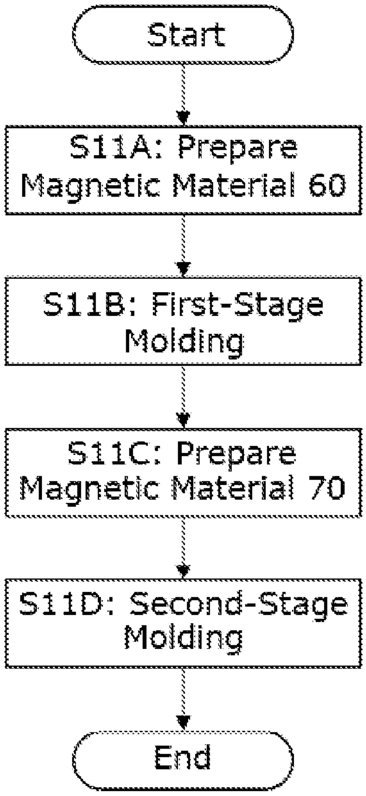
FIG. 6B is a flowchart showing a method of manufacturing a base body of a coil component according to one embodiment of the present invention.

The following now describes an example method of manufacturing the coil component 1 with reference to FIGS. 6A and 6B. In a step S11, the base body 10 is fabricated that has the coil conductor 25 provided therein and has the first region 15A1.

Figure 7A:
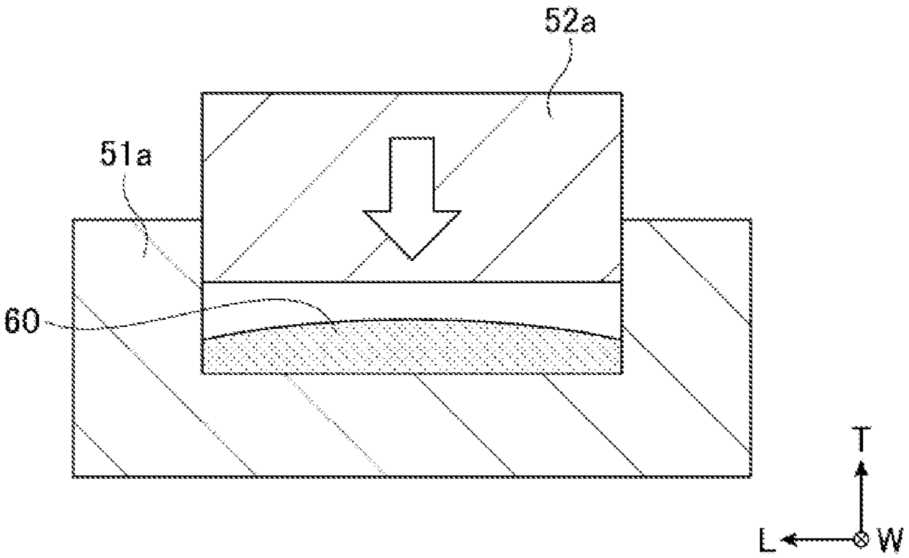
FIG. 7A is a schematic view showing one of the steps of a method of manufacturing a coil component according to one embodiment of the present invention.
Figure 7B:
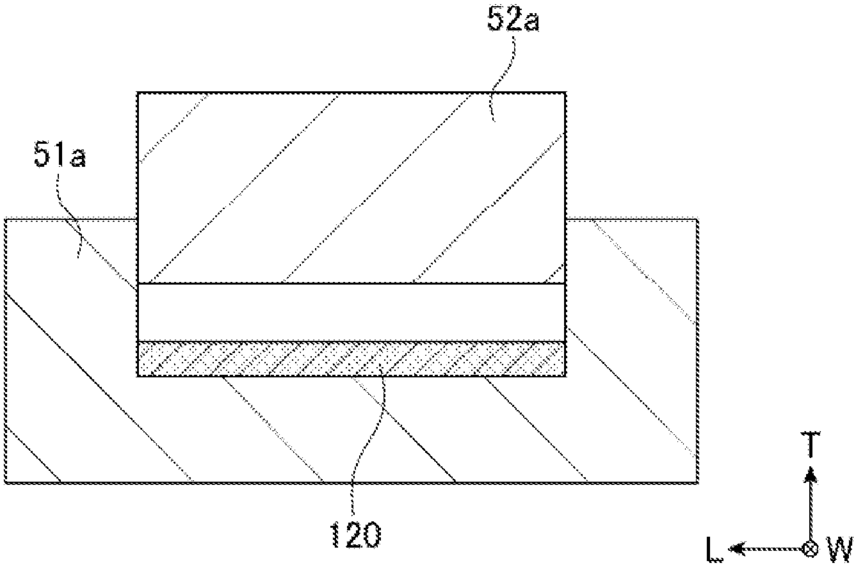
FIG. 7B is a schematic view showing one of the steps of the method of manufacturing a coil component according to one embodiment of the present invention.
Figure 8A:
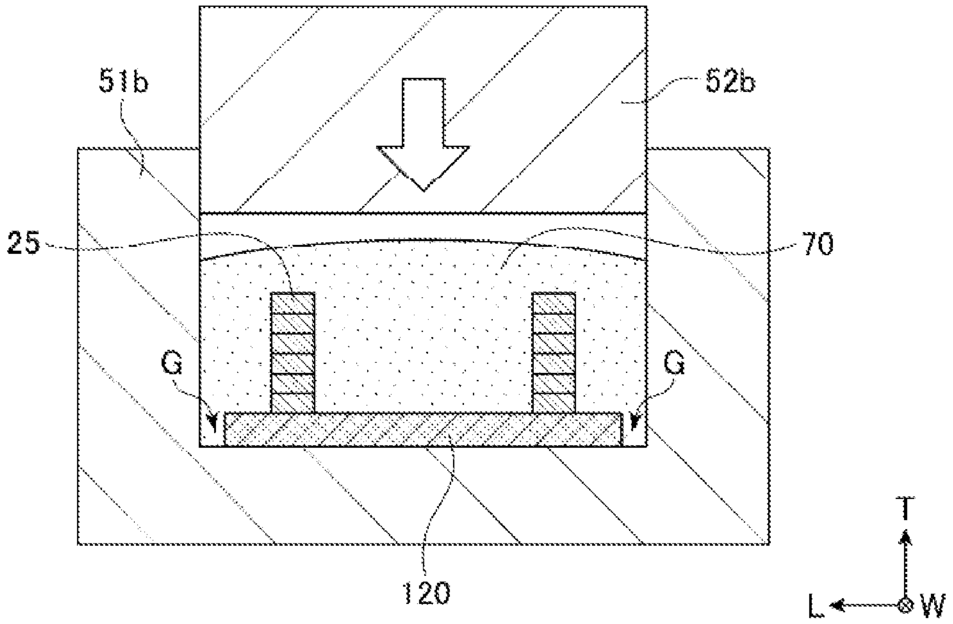
FIG. 8A is a schematic view showing one of the steps of the method of manufacturing a coil component according to one embodiment of the present invention.
Figure 8B:
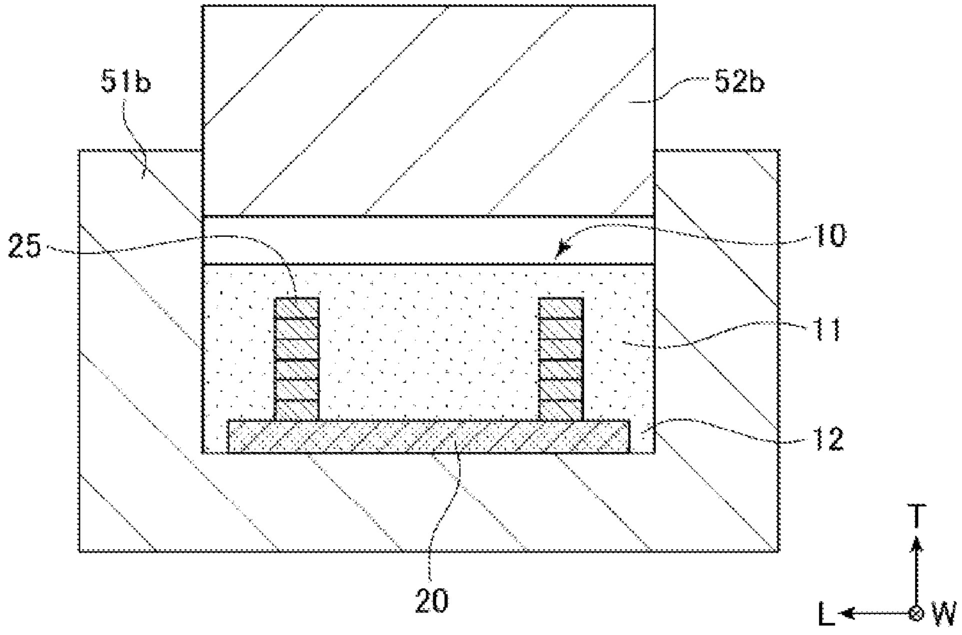
FIG. 8B is a schematic view showing one of the steps of the method of manufacturing a coil component according to one embodiment of the present invention.

The base body 10 can be fabricated in a variety of ways. The following describes a method of making the base body 10 using compression molding with reference to FIGS. 6B, 7A, 7B, 8A, 8B and 9. FIG. 6B shows the steps included in the step S11 of fabricating the base body 10, or a flow chart presenting an example process of manufacturing the base body 10 using compression molding. FIGS. 7A, 7B, 8A and 8B each schematically show one of the steps of the manufacturing process of the base body 10. Specifically, FIGS. 7A and 7B show the process of making the plate-like core 20, and FIGS. 8A and 8B show the process of fabricating the main body part 11 and the protruding part 12 having the coil conductor 25 provided therein.

Figure 9:
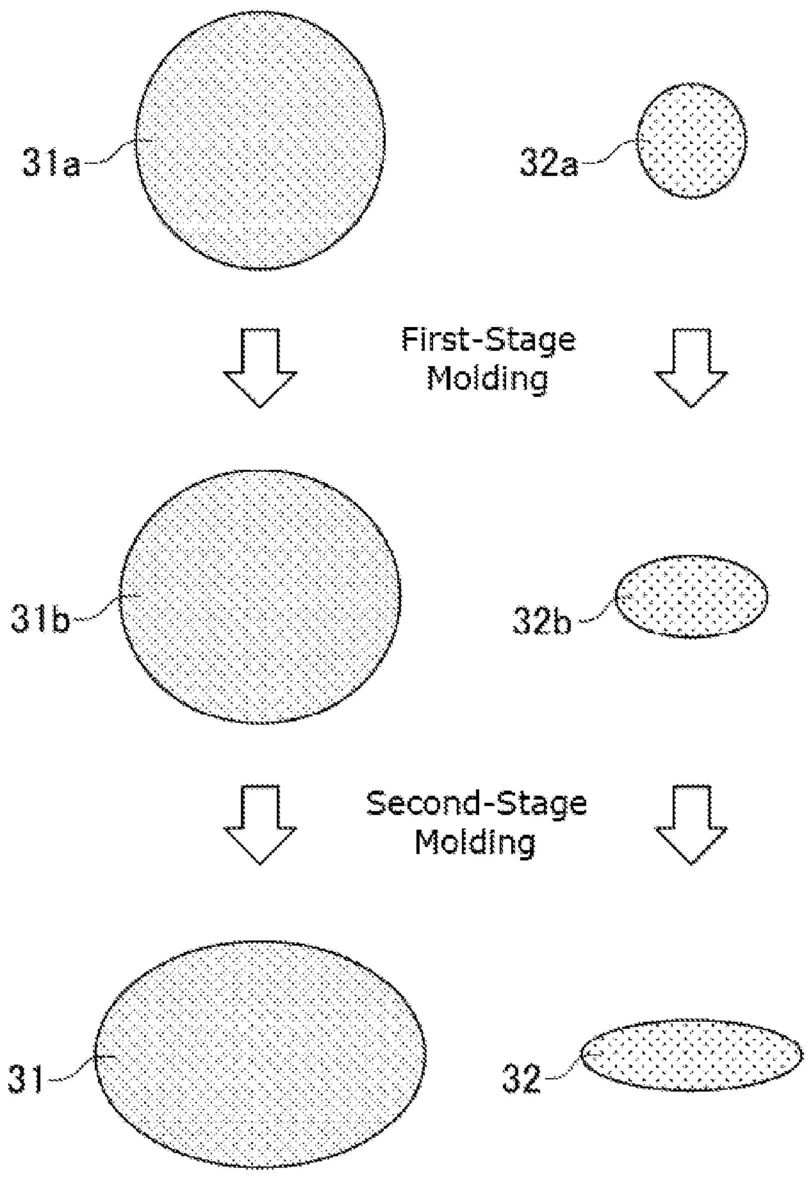
FIG. 9 is a schematic view illustrating how to flatten first and second metal magnetic particles.

To produce the base body 10, a magnetic material 60 is prepared in a step S11A to make a precursor of the plate-like core 20 (a precursor 120 shown in FIG. 7B). The magnetic material 60 is produced by mixing and kneading a powder mixture, which is obtained by blending together first magnetic powders 31*a* having a relatively large diameter and second magnetic powders 32*a* having a relatively small diameter, with a resin and a diluting solvent. The second magnetic powders 32*a* have lower deformation strength than the first magnetic powders 31*a*. The first and second magnetic powders 31*a* and 32*a* are processed into the first and second metal magnetic particles 31 and 32 in a finished product or the coil component 1. The first and second magnetic powders 31*a* and 32*a* both have a spherical shape as shown in FIG. 9. The average particle size of the first magnetic powders 31*a* is greater than the average particle size of the second magnetic powders 32*a*. A thermosetting resin can be used as the resin to make the magnetic material 60. The thermosetting resin may be, for example, a polyvinyl butyral (PVB) resin, an epoxy resin, a silicone resin, or any other known resins.

In the next step S11B, the magnetic material 60 is placed in the cavity of a die 51*a* and a first-stage molding is performed, as shown in FIG. 7A. In this manner, the precursor 120 is obtained. Specifically, after the magnetic material 60 is placed in the cavity, a punch 52*a* is moved downward in a stroke direction extending along the T-axis direction, so that the magnetic material 60 is compressed with a first molding pressure. The die 51*a* and punch 52*a* are shown as an example in FIG. 7A, and any other molds than the die 51*a* and punch 52*a* shown in FIG. 7A can be used in the first-stage molding. For example, the die 51*a* may be open toward the positive and negative sides in the T-axis direction (i.e., the upper and lower sides in the drawing). In this case, the punch 52*a* may include a pair of punches that face each other in the T-axis direction and can move along the T-axis direction. The first molding pressure can be within the range of 1 to 3 tons/$cm^2$, for example. By compressing the magnetic material 60 in the above-described manner, the precursor 120 of the plate-like core 20 is fabricated as shown in FIG. 7B.

As a result of the compression during the first-stage molding, the spherical first and second magnetic powders 31*a* and 32*a* contained in the magnetic material 60 are respectively deformed into flattened first and second magnetic powders 31*b* and 32*b*, as shown in FIG. 9. Since the second magnetic powders 32*a* have lower deformation strength than the first magnetic powders 31*a*, the compression during the first-stage molding deforms the second magnetic powders 32*a* more significantly than the first magnetic powders 31*a*. As a result, the aspect ratio of the flattened second magnetic powders 32*b* is higher than that of the flattened first magnetic powders 31*b*. Since the molding pressure is applied in a direction extending along the T axis, the flattened first and second magnetic powders 31*b* and 32*b* contained in the precursor 120 tend to be oriented such that their long axis extends along the WL plane (i.e., perpendicularly to the T-axis). For example, if the precursor 120 is cut along the LT plane and the obtained section is observed, the flattened first and second magnetic powders 31*b* and 32*b* are oriented in the L-axis direction. When the precursor 120 is cut along the TW plane and the section is observed, the flattened first and second magnetic powders 31*b* and 32*b* are oriented in the W-axis direction. As noted, the flattened first and second magnetic powders 31*b* and 32*b* contained in the precursor 120 are oriented in the L-axis direction in the WL plane perpendicular to the T-axis. Alternatively, the flattened first and second magnetic powders 31*b* and 32*b* may be randomly oriented in the WL plane perpendicular to the T axis. In other words, the flattened first and second magnetic powders 31*b* and 32*b* may not be oriented in a specific direction (for example, in the L- or W-axis direction) (i.e., they may be non-oriented) in the WL plane.

In the next step S11C, a magnetic material 70 is prepared to be used in a second-stage molding. The magnetic material 70 is produced by mixing and kneading third magnetic powders with a resin and a diluting solvent. The third magnetic powders are processed into the third metal magnetic particles 33 in a finished product or the coil component 1.

In the subsequent step S11D, the precursor 120 made in the step S11A and the magnetic material 70 are formed into the base body 10 through the second-stage molding. More specifically, as shown in FIG. 8A, the precursor 120 of the plate-like core 20 is placed in the cavity of a die 51*b*, which is different from the die 51*a*. When seen in the stroke direction (T-axis direction), the cavity of the die 51*b* has a larger area than the precursor 120 of the plate-like core 20. For example, the dimensions of the cavity of the die 51*b* in the L- and W-axis directions are greater than the corresponding dimensions of the die 51*a*. Accordingly, when the precursor 120 is placed in the cavity of the die 51*b*, a gap G is left between the precursor 120 and the side wall of the die 51*b* defining the cavity. The precursor 120 may be placed such that, when viewed in the stroke direction (T-axis direction), the gap G between the outer edge of the precursor 120 and the side wall of the die 51*b* can have a uniform size.

Following this, the coil conductor 25, which is prepared in advance, is placed on the precursor 120. The coil conductor 25 is placed in the cavity of the die such that the coil axis Ax coincides or substantially coincides with the stroke direction of the punch 51*b*. The coil axis Ax can be determined to substantially coincide with the stroke direction as long as the angle formed between the coil axis and the stroke direction of the punch is equal to or less than 30 degrees.

Subsequently, the magnetic material 70 is placed in the cavity of the die 51*b*, where the precursor 120 and the coil conductor 25 are placed. The gap G between the outer edge of the precursor 120 and the side wall of the die 51*b* may be filled with the magnetic material 70. If the gap G only has a small dimension, it may not be necessary to fill the gap G with the magnetic material 70.

After the magnetic material 70 is placed in the cavity, a punch 52*b* is moved downward in the stroke direction, so that the precursor 120 and the magnetic material 70 in the cavity are compressed with a second molding pressure. The second molding pressure is greater than the first molding pressure. The second molding pressure can be within the range of 5 to 10 tons/$cm^2$, for example.

As shown in FIG. 8B, the precursor 120 is compressed in the second-stage molding into the plate-like core 20, and the magnetic material 70 is compressed into the main body portion 11 and protruding portion 12.

Since the gap G has a uniform width when seen in the stroke direction (T-axis direction), the protruding portion 12, which is formed in the above-described manner, can also have a uniform width. In other words, the protruding portion 12 can be defined between (i) the plate-like core 20 and (ii) the first end surface 10*c*, second end surface 10*d*, first side surface 10*e* and second side surface 10*f* of the base body 10 so as to extend in the circumferential direction around the coil axis Ax along these four surfaces of the base body 10. Accordingly, the protruding portion 12 can have a uniform dimension in the radial direction centered on the coil axis Ax. When the base body 10 has a rectangular parallelepiped shape, the precursor 120 of the plate-like core 20 preferably has a rectangular parallelepiped shape in order to achieve a uniform width for the protruding portion 12. The present embodiment, however, is not limited to such, and the precursor 120 of the plate-like core 20 can be shaped like a circular cylinder, an oval cylinder or any other shapes as long as they are symmetrically shaped with respect to the coil axis Ax.

When the gap G is not filled with the magnetic material 70, the compression performed during the second-stage molding can result in elongating the precursor 120 perpendicularly to the T-axis. In this case, the gap G between the precursor 120 and the sidewall of the cavity of the die 51*b*, which is left before the compression performed during the second-stage molding, is filled with the precursor 120 formed into the plate-like core 20. Part of the gap G may be filled with the magnetic material 70, and the remaining may not be filled with the magnetic material 70. In this case, the protruding portion 12 occupies a partial region of the gap G that is filled with the magnetic material 70, and part of the plate-like core 20 occupies the remaining region of the gap G that is formed by the elongated precursor 120.

As a result of the compression during the second-stage molding, as shown in FIG. 9, the flattened first and second magnetic powders 31*b* and 32*b* are further compressed into the first and second metal magnetic particles 31 and 32. The first metal magnetic particles 31 have the first aspect ratio R1, and the second metal magnetic particles 32 have the second aspect ratio R2, which is greater than the first aspect ratio R1. Although not shown in the drawings, the third magnetic powders contained in the magnetic material 70 may also be deformed into a flattened shape through the compression during the second-stage molding.

While the compression is performed during the second-stage molding, the flattened first and second magnetic powders 31*b* and 32*b* are deformed while flowing. Since the flattened first magnetic powders 31*b* are oriented such that their long axis extends along the WL plane (orthogonally to the T axis), the flattened second magnetic powders 32*b* flow along the surface of the flattened first magnetic powders 31*b*. For this reason, the compression in the second-stage molding tends to cause the flattened second magnetic powders 32*b* to be oriented such that their long axis extends along the WL plane (orthogonally to the T axis). Since the flattened second magnetic powders 32*b* have a smaller diameter than the flattened first magnetic powders 31*b*, the orientation of the flattened second magnetic powders 32*b* is less likely to change during the compression than that of the flattened first magnetic powders 31*b*. Since the flattened first and second magnetic powders 31*b* and 32*b* are densely arranged in the precursor 120, however, the flattened second magnetic powders 32*b* tend to flow to be oriented such that their long axis extends along the WL plane as they are guided along the surface of the flattened first magnetic powders 31*b*, which have a higher deformation strength, during the compression in the second-stage molding. As a result, in the plate-like core 20 formed by the second-stage molding, it is not only the first metal magnetic particles 31 but also the second metal magnetic particles 32 that can be oriented in the direction extending along the WL plane (i.e., perpendicularly to the coil axis Ax).

In addition, since the gap G is present in the cavity of the die 51*b* between the precursor 120 and the side wall of the cavity, the flattened first and second magnetic powders 31*b* and 32*b* contained in the precursor 120 tend to flow perpendicularly to the stroke direction during the compression in the second-stage molding. As described above, the gap G is filled with the magnetic material 70 as a result of the second-stage molding. The magnetic material 70 filling the gap G has a large number of voids, and the metal magnetic particles are less densely arranged in the magnetic material 70 in the gap G than in the precursor 120. This allows the flattened first and second magnetic powders 31*b* and 32*b* contained in the precursor 120 to flow toward the gap G. For this reason, the flattened first and second magnetic powders 31*b* and 32*b* contained in the precursor 120 tend to flow perpendicularly to the stroke direction (T-axis direction). As a result, in the plate-like core 20, the first and second metal magnetic particles 31 and 32 tend to be oriented perpendicularly to the stroke direction.

In the above-described manner, the base body 10 is manufactured that has the coil conductor 25 provided therein. The base body 10 has the plate-like core 20, main body portion 11, and protruding portion 12. The coil conductor 25 is provided on the plate-like core 20.

After the base body 10 is produced that has the coil conductor 25 provided therein as a result of the step S11 in the above-described manner, the manufacturing process transfers to the step S12. In the step S12, the base body 10 is subjected to thermal treatment, to cure the resin contained in the plate-like core 20, main body portion 11, and protruding portion 12. As a result, adjacent ones of the metal magnetic particles are bound to each other via the cured resin, so that the thermally treated base body 10 is produced. The thermal treatment is performed at a temperature equal to or higher than the curing temperature of the resin contained in the magnetic materials 60 and 70. The heating in the step S12 is performed at a temperature of 150° C. to 300° C. for a duration of 30 to 240 minutes, for example.

In the next step S13, a conductor paste is applied to the surface of the base body 10, which is obtained in the step S12, to form the external electrodes 21 and 22. The external electrode 21 is electrically connected to one of the ends of the coil conductor 25 placed within the base body 10, and the external electrode 22 is electrically connected to the other end of the coil conductor 25 placed within the base body 10. The external electrodes 21 and 22 may include a plated layer. The plated layer may include two or more layers. The two-layered plated layer may include an Ni plated layer and an Sn plated layer disposed on the outer side of the Ni plated layer. Alternatively, the coil conductor 25 may be placed such that their ends are exposed out of the base body 10, and the exposed portions of the coil conductor 25 are bent toward the bottom surface 10*b*, so that the exposed portions of the coil conductor 25 form the external electrodes.

In the above-described manner, the coil component 1 is completed. The manufactured coil component 1 may be mounted on the mounting substrate 2*a* using a reflow process. In this process, the mounting substrate 2*a* having the coil component 1 thereon passes at a high speed through a reflow furnace heated to, for example, a peak temperature of 260° C., and then the external electrodes 21, 22 are soldered to the corresponding lands 3 of the mounting substrate 2*a*. In this way, the coil component 1 is mounted on the mounting substrate 2*a*, and thus the circuit board 2 is manufactured.

According to the above manufacturing method, the first magnetic powders 31*a* contained in the magnetic material 60 have a spherical shape, but may be deformed into a flattened shape in advance. The first magnetic powders 31*a* deformed into a flatted shape have an aspect ratio greater than one and less than the first aspect ratio R1. Since the first magnetic powders 31*a* contained in the magnetic material 60 are deformed into a flattened shape in advance, the compression during the first-stage molding can facilitate the flattened second magnetic powders 32*b*, which result from the deformation of the second magnetic powders 32*a*, to be oriented perpendicularly to the stroke direction (in the direction extending along the WL plane).

The manufacturing method described above is an example method of manufacturing the coil component 1, and the coil component 1 can be produced in any other manners than the method described above. For example, the base body 10 may be manufactured by a known method other than the compression molding method, such as a sheet lamination method, a slurry build method, or a thin film processing method.

When the sheet lamination method is employed to make the base body 10, a slurry is obtained by mixing and kneading the first and second metal magnetic particles 31 and 32 with a resin, applied to the surface of a base film such as a plastic film using various types of sheet forming machines such as a doctor-blade sheet forming machine, and dried, to form a first magnetic sheet. When the slurry is applied onto the base film, the first and second metal magnetic particles 31 and 32 are oriented by the blade such that their respective long axes extend along the surface of the base film. In this manner, as the first and second metal magnetic particles 31 and 32 having a flattened shape are applied to the base film using the doctor blade method, the resulting first magnetic sheet contains the first and second metal magnetic particles 31 and 32 oriented in the direction extending along the sheet surface. The first magnetic sheet or a laminate of a plurality of first magnetic sheets is processed into the first region 15A1 in a finished product or the coil component 1. Another slurry is obtained by mixing and kneading the third metal magnetic particles 33 with a resin, applied to the surface of a base film such as a plastic film, and dried, to form a second magnetic sheet. A conductive paste made of a highly conductive metal or alloy is printed on part of the second magnetic sheet. The second magnetic sheet has a through hole formed therein, which is filled with the conductive paste. In this manner, the resulting second magnetic sheet has a conductor pattern formed thereon. Part of the conductor pattern may be formed on the first magnetic sheet. The first and second magnetic sheets prepared as described above are stacked on each other, to form a laminate. A plurality of second magnetic sheets are stacked such that the adjacent conductive pastes are connected to each other via the conductive paste filling the through-holes. The laminate is then heated to cure the resin, so that the base body 10 can be obtained.

Alternatively, the precursor 120 of the plate-like core 20 may be prepared using the sheet lamination method and placed in the cavity of the die 51*b* along with the coil conductor 25, and the magnetic material 70 may be then placed in the cavity of the die 51*b*. The second-stage molding may be then performed.

The coil component 101 shown in FIG. 5 may be manufactured through the same steps as the coil component 1. The manufacturing process of the coil component 101 includes a first-stage molding step S11B in which precursors of the plate-like cores 120A and 120B are respectively made, and also includes a second-stage molding step S11D in which these two precursors are used. In the second-stage molding step S11D, the coil conductor 25 is placed on the precursor of the plate-like core 120A, and the precursor of the plate-like core 120B is placed on the coil conductor 25. The magnetic material 70 is then placed in the cavity of the die 51*b*, and a pressure is subsequently applied using the punch 52*b*. The precursor of the plate-like core 120B is placed on the coil conductor 25 such that a gap (interval) is left between the outer edge of the precursor and the side wall of the cavity of the die 51*b*. The magnetic material 70 may be poured into the cavity through the gap between the outer edge of the precursor of the plate-like core 120B and the side wall of the cavity of the die 51*b*. If the precursor of the plate-like core 120B is smaller than the precursor of the plate-like core 120A, a larger gap than the gap G can be left between the precursor of the plate-like core 120B and the side wall of the cavity of the die 51*b*. The magnetic material 70 can be easily powered into the cavity if a larger gap than the gap G is left between the precursor of the plate-like core 120B and the side wall of the cavity of the die 51*b*. In one embodiment, after the coil conductor 25 is placed on the precursor of the plate-like core 120A, the magnetic material 70 may be poured into the cavity, and the precursor of the plate-like core 120B may be then placed on the coil conductor 25.

The sheet lamination method may be employed to fabricate the base body when the core region 15B contains the first and second metal magnetic particle 31 and 32, or when the margin region 15C contains the first and second metal magnetic particles 31 and 32. For example, first magnetic sheets are made in the above-described manner and stacked to make the core region 15B or margin region 15C containing the first and second metal magnetic particles 31 and 32. The coil conductor 25 may be provided in the base body such that the coil axis Ax extends perpendicularly to the T axis when the core region 15B of the base body contains the first and second metal magnetic particle 31 and 32, or when the margin region 15C of the base body contains the first and second metal magnetic particles 31 and 32. In this case, a through hole is formed in each first magnetic sheet and filled with a conductive paste, and the first magnetic sheets with the through holes being filled with the conductive paste are connected to each other such that the conductive pastes in the adjacent sheets are connected, so that the connected conductive pastes can form the winding portion 25*a* of the coil conductor 25.

EXAMPLES

Coil components were fabricated using the compression molding method described above, and their inductance and saturation current value were measured. Specifically, the coil components were made in the following manner. To begin with, spherically shaped Fe amorphous particles having an average particle size of 25 μm (hereinafter referred to as "the large particles") and spherically shaped carbonyl iron particles having an average particle size of 4 μm (hereinafter referred to as "the small particles") were prepared and mixed and kneaded with an epoxy resin, to produce a first resin mixture composition. Since the large particles are composed of amorphous Fe, they have higher deformation strength than the small particles, which are composed of carbonyl iron. The first resin mixture composition was poured into the cavity of a first die, and a molding pressure of 2 ton/cm$^2$ was applied to the first resin mixture composition in the cavity using a punch. In this manner, the precursor of the plate-like core 20 was made. The cavity is 2.3 mm in the L-axis direction and 1.8 mm in the W-axis direction. Subsequently, the precursor of the plate-like core 20 was placed in the cavity of a second die, and a conductive ribbon-like member wound 6.5 turns was placed on the precursor. The cavity of the second die is 2.5 mm in the L-axis direction and 2.0 mm in the W-axis direction. Into the cavity where the precursor of the plate-like core 20 and the conductive ribbon-like member were placed, a second resin mixture composition, which was produced by mixing and kneading Fe—Si—Cr alloy particles with an epoxy resin, was poured. A molding pressure of 7 ton/cm$^2$ was applied using a punch to the second resin mixture composition in the cavity. In this manner, a molded body was produced that has the ribbon-like member provided therein. Subsequently, the molded body was removed from the cavity and thermally treated at a temperature of 200° C. for a duration of 60 minutes, to cure the epoxy resin in the molded body. In this manner, the molded body was processed into the base body 10. The conductive ribbon-like member extending out of the first and second end surfaces 10*c* and 10*d* of the base body 10 was bent, so that the external electrodes 21 and 22 were formed. In the above-described manner, a coil component (sample 1) was fabricated.

An impedance analyzer was used to measure the inductance and saturation current value Idc1 of the sample 1. As shown in Table 1, the inductance was 0.9 μH and the saturation current value Idc1 was 6.8 A for the sample 1. The saturation current value indicates the value of the DC current observed when the inductance of the inductor drops 30% from an initial value of the inductance as a result of DC current applied to the inductor. The initial value of the inductance is the value measured when no DC current is applied to the inductor.

The sample 1 was cut along the coil axis Ax (T-axis direction) to expose a section, and the section was polished. After the polishing, a partial region of the section that is within the plate-like core 20 was photographed using a scanning electron microscope (SEM) at a magnification of 1000×, so that an SEM photograph was obtained. For each of the large particles (first metal magnetic particles 31) in this SEM photograph, the dimensions of the long and short axes were measured, and the ratio of the dimension of the long axis to the dimension of the short axis was calculated as an aspect ratio R11 of the large particles. The average of the aspect ratios R11 calculated for the large particles contained in the SEM photograph was calculated. The "Aspect Ratio R11" column in Table 1 shows the average of the aspect ratios R11 of the large particles calculated in this way. In a similar manner, an aspect ratio R12 was calculated for each of the small particles included in the SEM photograph, and the average of the aspect ratios R12 calculated for the small particles included in the SEM photograph was calculated. The "Aspect Ratio R12" column in Table 1 shows the average of the aspect ratios R12 of the small particles calculated in this way. As listed in Table 1, the average of the aspect ratios R11 of the large particles was 1.1, and the average of the aspect ratios R12 of the small particles was 1.8.

After this, a sample 2 (comparative example 1) was fabricated according to the same process as the sample 1 except for the molding pressure. To make the sample 2, a molding pressure of 8 ton/cm$^2$ was applied to the first resin mixture composition in the cavity. The inductance and saturation current value Idc1 were measured for the sample 2 manufactured in this way, and the aspect ratios R11 and R12 of the large and small particles contained in the sample 2 were calculated, respectively. As listed in Table 1, the inductance was 0.9 μH and the saturation current value Idc1 was 6.8 A for the sample 2. The average of the aspect ratios R11 of the large particles in the sample 2 was 1.1, and the average of the aspect ratios R12 of the small particles was 1.3. Comparison between the samples 1 and 2 confirms that the inductance is improved by increasing the aspect ratio of the small particles.

Subsequently, a sample 3 (comparative example 2) was made according to the same process as the sample 1 except for that the small particles were not spherically shaped but had a flattened shape having an aspect ratio of 5.5. The small particles used to make the sample 3 were carbonyl iron particles that were deformed in an attritor before mixed with an epoxy resin to have an aspect ratio of 5.5. The inductance and saturation current value Idc1 of the sample 3 thus prepared were measured, and the aspect ratios R11 and R12 of the large and small particles contained in the sample 3 were calculated, respectively. As listed in Table 1, the inductance was 1.4 μH and the saturation current value Idc1 was 3.5 A for the sample 3. The average of the aspect ratios R11 of the large particles in the sample 3 was 1.1, and the average of the aspect ratios R12 of the small particles was 5.7. Comparison between the samples 1 and 3 confirms that the inductance may be improved but the saturation current value drops if the aspect ratio of the small particles is excessively increased.

Following this, a sample 4 (comparative example 3) was fabricated according to the same process as the sample 1 except for that the large particles were not spherically shaped but have a flattened shaped having an aspect ratio of 3.4 and that the small particles are not spherically shaped but have a flattened shape having an aspect ratio of 4.0. The large and small particles used to make the sample 4 were deformed in an attritor before mixed with an epoxy resin to have aspect ratios of 3.4 and 4.0. The inductance and saturation current value Idc1 of the sample 4 thus prepared were measured, and the aspect ratios R11 and R12 of the large and small particles contained in the sample 4 were calculated, respectively. As listed in Table 1, the inductance was 1.7 μH and the saturation current value Idc1 was 3.1 A for the sample 4. The average of the aspect ratios R11 of the large particles in the sample 4 was 3.5, and the average of the aspect ratios R12 of the small particles was 4.2. Comparison between the samples 1 and 4 confirms that the inductance may be improved but the saturation current value drops if the aspect ratio of the large particles is excessively increased.

TABLE 1

| | Aspect Ratio R11 | Aspect Ratio R12 | R12/R11 | Inductance L [μH] | Saturation Current Value Idc1 [A] |
|---|---|---|---|---|---|
| Sample 1 (Implementation Example 1) | 1.1 | 1.8 | 1.64 | 1.1 | 6.8 |
| Sample 2 (Comparative Example 1) | 1.1 | 1.3 | 1.09 | 0.9 | 6.8 |
| Sample 3 (Comparative Example 2) | 1.1 | 5.7 | 4.75 | 1.4 | 3.5 |
| Sample 4 (Comparative Example 3) | 3.5 | 4.2 | 1.20 | 1.7 | 3.1 |

The dimensions, materials, and arrangements of the constituent elements described for the above various embodiments are not limited to those explicitly described for the embodiments, and these constituent elements can be modified to have any dimensions, materials, and arrangements within the scope of the present invention.

Constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

What is claimed is:

1. A coil component comprising:

a base body; and a coil conductor provided in the base body;

wherein the base body has an oriented region containing (i) a plurality of first metal magnetic particles having a first aspect ratio greater than one, having a first average particle size and oriented in a reference direction and (ii) a plurality of second metal magnetic particles having a second aspect ratio greater than the first aspect ratio, having a second average particle size less than the first average particle size and oriented in the reference direction, wherein the coil conductor extends around a coil axis, wherein the reference direction extends perpendicularly to the coil axis, wherein the base body has a first region covering one end surface of the coil conductor in an axial direction extending along the coil axis, and wherein the oriented region occupies at least part of the first region.

2. The coil component of claim 1, wherein the one end surface of the coil conductor touches the first region.

3. The coil component of claim 1, wherein a ratio of the second aspect ratio to the first aspect ratio is 1.3 or more.

4. The coil component of claim 1, wherein the first aspect ratio is 1.2 or less.

5. The coil component of claim 1, wherein the second aspect ratio is 1.4 or more.

6. The coil component of claim 1, wherein the second aspect ratio is 5.0 or less.

7. The coil component of claim 1, wherein the first metal magnetic particles have first deformation strength, and wherein the second metal magnetic particles have second deformation strength lower than the first deformation strength.

8. The coil component of claim 1, wherein the base body further has a core region that is inside the coil conductor in a radial direction centered on the coil axis, and wherein the core region includes a plurality of third metal magnetic particles having a third aspect ratio less than the second aspect ratio.

9. The coil component of claim 8, wherein the core region touches the first region.

10. The coil component of claim 1, wherein the base body further has a second region covering the other end surface of the coil conductor in the axial direction, and wherein the second region contains (i) a plurality of fourth metal magnetic particles having a fourth aspect ratio greater than one, having a fourth average particle size and oriented in the reference direction and (ii) a plurality of fifth metal magnetic particles having a fifth aspect ratio greater than the fourth aspect ratio, having a fifth average particle size less than the fourth average particle size and oriented in the reference direction.

11. The coil component of claim 1, wherein the oriented region occupies at least part of a core region that is inside a winding portion of the coil conductor in a radial direction centered on the coil axis.

12. The coil component of claim 1, wherein the oriented region occupies at least part of a margin region that is outside a winding portion of the coil conductor in a radial direction centered on the coil axis.

13. A circuit board comprising the coil component of claim 1.

14. An electronic device comprising the circuit board of claim 13.

* * * * *